United States Patent Office 2,831,005
Patented Apr. 15, 1958

2,831,005
METHYL 5-HYDROXY-8-METHOXYOCTANOATE

Edward Walton, Scotch Plains, N. J., assignor to Merck & Co., Inc., Rahway, N. J., a corporation of New Jersey No Drawing. Application October 26, 1953
Serial No. 388,451

1 Claim. (Cl. 260—410.9)

This invention relates to the production of thiourea and substituted thiourea derivatives of aliphatic carboxylic acids. More particularly, this invention is concerned with novel processes for the production of 5,8-bis-[2-(2-thiopseudoureido)] octanoic acids of the formula

```
        HN
          \\
           CSCH₂CH₂CH₂CHCH₂CH₂CH₂COOH
   R''HN /                |
                          S
                          |
                          C
                        // \
                     HN    NHR''
``` wherein R" is hydrogen or a hydrocarbon radical such as an alkyl, aryl, or aralkyl group. This invention is also concerned with novel intermediate compounds useful in such processes.

5,8-bis-[2-(2-thiopseudoureido)] octanoic acid is shown in the J. Am. Chem. Soc. 74, 2382 (1952), to be a precursor in the preparation of the valuable growth-promoting agent 4[3-(1,2-dithiacyclohexyl)] butyric acid.

However, the methods of producing 5,8-bis-[2-(2-thiopseudoureido)] octanoic acid heretofore known are not especially satisfactory. These prior art methods have the disadvantages of utilizing reactants which are not readily available and which are undesirably expensive. In addition such methods often result in low yields of the products.

Therefore an object of this invention is to provide novel processes of producing 5,8-bis-[2-(2-thiopseudoureido)] octanoic acid and related compounds in good yields using readily available, inexpensive reactants. Another object is to provide novel compounds which are useful intermediates in these processes. It is also an object to provide an improved process of producing 4[3-(1,2-dithiacylohexyl)] butyric acid.

According to the present invention it has been discovered that the production of 5,8-bis-[2-(2-thiopseudoureido)] octanoic acid and similar compounds in which the thiourea moiety is substituted is achieved by reacting a γ-ether of propyl magnesium halide (I) with an ester of γ-formylbutyric acid (II) to form a Grignard complex, decomposing the complex to obtain the corresponding ester of a 5-hydroxy-8-ether-octanoic acid (III) and reacting said compound as the ester or free acid with thiourea or a substituted thiourea under acidic conditions to produce an acid addition salt of the corresponding 5,8-bis-[2-(2-thiopseudoureido)] octanoic acid (IV) and neutralizing said salt to obtain the free base (V). This process may be illustrated as follows:

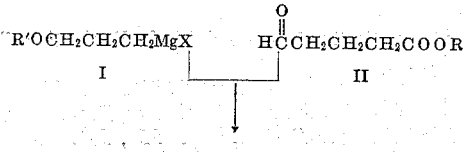

```
      R'OCH₂CH₂CH₂CHCH₂CH₂CH₂COOR
III                |
                  OH
                  |
                  S
                  ‖
              H₂N—C—NHR''
                  |
                  HY
     HN
       \\
        CSCH₂CH₂CH₂CHCH₂CH₂CH₂COOH
  R''HN/            |
                    S       · 2HY
                    |
                    C
                  // \
               HN    NHR''
IV
                    |
     HN
       \\
        CSCH₂CH₂CH₂CHCH₂CH₂CH₂COOH
  R''HN/            |
                    S
                    |
                    C
                  // \
V              HN    NHR''
``` wherein R and R' represent hydrocarbon radicals such as alkyl, aryl and aralkyl groups, R" is hydrogen and hydrocarbon groups such as R and R', X is a halogen and Y is an anion of a strong acid.

In the first step of this process esters of 5-hydroxy-8-ether-octanoic acid are produced by reacting a γ-ether of propyl magnesium halide with an ester of γ-formylbutyric acid. This reaction is conveniently effected in the presence of an anhydrous solvent such as ethyl ether, tetrahydrofuran, tetrahydropyran and the like. The condensation proceeds rapidly at ordinary temperatures to form a Grignard complex which may be readily converted to the desired ester of 5-hydroxy-8-ether-octanoic acid by the addition of dilute acid to the reaction mixture. The organic solvent phase is separated and the solvent distilled to obtain the product in the form of an oil.

According to a specific illustration of this reaction, γ-methoxypropyl magnesium chloride is condensed with methyl γ-formylbutyrate in ether to form the corresponding Grignard complex which is decomposed with hydrochloric acid to produce methyl 5-hydroxy-8-methoxyoctanoate. Similar reactions may be effected using other alkyl, aryl and aralkyl esters of γ-formylbutyric acid, such as the ethyl, propyl, phenyl and benzyl esters thereof, as starting materials. Such esters can be prepared by known methods, one suitable method being disclosed in the J. Am. Chem. Soc. 67, 2096 (1945). In addition to γ-methoxypropyl magnesium chloride, other alkyl, aryl and aralkyl γ-ethers of propyl magnesium halide are suitable for use in this reaction. Thus, γ-ethoxy, γ-propoxy, γ-butoxy, γ-phenoxy, and γ-benzyloxy propyl magnesium halides may also be used conveniently. These and similar γ-ethers may be produced according to known procedures such as are disclosed in Zentr. I, 925 (1933).

In addition to methyl 5-hydroxy-8-methoxyoctanoate other similar novel compounds may be produced according to this reaction, examples of which are ethyl 5-hydroxy-8-methoxy-octanoate, propyl 5-hydroxy-8-butoxyoctanoate, methyl 5 - hydroxy - 8 - benzylocyoctanoate, phenyl 5-hydroxy-8-methoxyoctanoate, propyl 5-hydroxy-8-benzyloxyoctanoate and the like. These and similar esters may be conveniently converted to the free acid by alkaline hydrolysis followed by neutralization of the resulting salt with a suitable acid. The resulting free acids however are ordinarily present in the form of an equilibrium mixture consisting of 5-hydroxy-8-ether-octanoic acid and the corresponding 5-valerolactone.

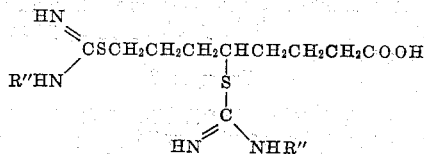

```
R'OCH₂CH₂CH₂MgX     HCCH₂CH₂CH₂COOR
                    ‖
                    O
       I                  II
```

In the next step of this process the 5-hydroxy-8-alkoxy, aryloxy and aralkoxy octanoic acids and esters thereof produced above are reacted with thiourea or an N-substituted thiourea to form 5,8-bis[2-(2-thiopseudoureido)] octanoic acid or the corresponding N-substituted thiourea compounds.

In addition to thiourea, N-substituted thioureas such as N-methyl thiourea, N-ethyl thiourea, N-phenyl thiourea and N-benzyl thiourea may also be employed in this reaction to produce the corresponding N-substituted compounds.

This reaction is conveniently achieved by contacting the appropriate reactants in the presence of a strong acid in aqueous solution at normal or elevated temperatures, preferably at reflux temperature. Hydrogen chloride, hydrogen iodide, hydrogen bromide and sulfuric acid are examples of acids suitable for use in this process. The desired bis thiourea derivative forms quickly and, if desired, it may be conveniently isolated from the reaction mixture in the form of an acid addition salt according to conventional methods.

Representative of the compounds which are produced according to this reaction from the appropriate reactants are acid addition salts of 5,8-bis[2-(2-thiopseudoureido)] octanoic acid, 5,8-bis[2-(1-methyl-2-thiopseudoureido)] octanoic acid, 5,8-bis[2-(1-propyl-2-thiopseudoureido)] octanoic acid, 5,8-bis[2-(1-benzyl-2-thiopseudoureido)] octanoic acid and 5,8-bis[2-(1-phenyl-2-thipseudoureido)] octanoic acid such as the dihydrobromide, dihydrochloride, sulfate and phosphate salts.

Acid addition salts of these and similar compounds are readily converted to the corresponding free bases by neutralization with a suitable alkali metal or alkaline earth metal base such as a carbonate or hydroxide thereof and preferably sodium hydroxide. This neutralization is ordinarily effected in aqueous solution. Following neutralization the product may be conveniently isolated by extraction with an immiscible solvent such as ether and subsequent evaporation of the solvent.

Although it is considered that the invention and means for its practice have been fully and completely disclosed above, nevertheless the following examples are added to illustrate a specific embodiment and practical application of this invention. It is understood however, that these examples in no way limit or are intended to limit the scope of the invention.

*Example 1*

To 9 g. of magnesium turnings in 100 ml. of dry ether is added a few crystals of aluminum chloride and a small amount of γ-chloropropyl methyl ether. The reaction is initiated by warming and the remainder of a total of 31.5 g. of γ-chloropropyl methyl ether in 100 ml. of dry ether is added at such a rate as to maintain gentle refluxing. A greyish solid is present at the end of the reaction. The mixture is then decanted into a dry dropping funnel by rinsing with several portions of dry ether.

The γ-methoxypropyl magnesium chloride is added slowly to a solution of 60 g. of methyl γ-formylbutyrate in 100 ml. of dry, refluxing ether. A heavy, gummy precipitate forms and the mixture is poured over about 500 gm. of ice mixed with 65 ml. of hydrochloric acid. The mixture is stirred until all solids dissolve, the layers are separated and the aqueous layer is washed twice with 100 ml. portions of ether. The ether solutions are combined, washed with 50 ml. of water, twice with 50 ml. portions of 5% sodium bicarbonate solution, again with 50 ml. of water and are dried over sodium sulfate. The ether is removed at atmospheric pressure and the residue distilled to 170° C./0.001 mm. The distillate is washed twice with 15 ml. of saturated sodium bisulfite solution, once with water and dried to give methyl 5-hydroxy-8-methoxyoctanoate as a viscous oil.

The methyl 5-hydroxy-8-methoxyoctanoate is added to 10 ml. of 40% aqueous hydrobromic acid containing 4.5 g. of thiourea and the mixture is refluxed to produce 5,8-bis[2-(2-thiopseudoureido)] octanoic acid dihydrobromide. The mixture is cooled and neutralized with 8 N sodium hydroxide to form 5,8-bis[2-(2-thiopseudoureido)] octanoic acid.

The preparation of 4-[3-(1,2-dithiacyclohexyl)] butyric acid from 5,8-bis[2-(2-thiopseudoureido)] octanoic acid is achieved as follows:

The 5,8-bis[2-(2-thiopseudoureido)] octanoic acid produced above is taken up in water together with 8 ml. of 8 N sodium hydroxide. The mixture (0.5 N in sodium hydroxide) is refluxed for 15 minutes to form trisodium 5,8-dimercaptooctanoate. The reaction mixture is cooled in ice and acidified to pH 2 with hydrochloric acid to form 5,8-dimercaptooctanoic acid. The product is extracted into chloroform. The chloroform extract of the latter compound is treated with small portions of a 10% solution of iodine in aqueous potassium iodine until the iodine color no longer fades. The chloroform extract containing 4-[3-(1,2-dithiacyclohexyl)]butyric acid is washed with 2% aqueous sodium bisulfite and extracted with saturated sodium bicarbonate solution. The aqueous extract is acidified to pH 2 with hydrochloric acid and extracted with ether. The ether extract is dried over magnesium sulfate and the solvent is removed under reduced pressure. 4-[3-(1,2-dithiacyclohexyl)] butyric acid is obtained as an oil.

*Example 2*

About 20 g. of γ-benzyloxypropyl magnesium chloride is added to a dry ether solution of 25 g. of propyl γ-formylbutyrate at the reflux temperature. The addition is made slowly and upon completion the mixture is poured into ice containing hydrochloric acid. The ether solution is separated and washed with aqueous sodium bicarbonate. The ether is removed under diminished pressure to yield propyl 5-hydroxy-8-benzyloxyoctanoate.

The propyl-5-hydroxy-8-benzyloxyoctanoate is then added to 10 ml. of concentrated hydrochloric acid containing 8 g. of N-methyl thiourea. After refluxing for 1 hour the mixture containing 5,8-bis[2-(1-methyl-2-thiopseudoureido)] octanoic acid dihydrochloride is cooled and neutralized with sodium hydroxide to obtain the free base.

Various changes and modifications of the invention can be made and, to the extent that such variations incorporate the spirit of this invention, they are intended to be included within the scope of the appended claim.

What is claimed is:
Methyl 5-hydroxy-8-methoxyoctanoate.

References Cited in the file of this patent

UNITED STATES PATENTS

| | | |
|---|---|---|
| 2,025,984 | Harris | Dec. 31, 1935 |
| 2,542,062 | Swern | Feb. 20, 1951 |
| 2,759,005 | Starker et al. | Aug. 14, 1956 |

OTHER REFERENCES

"Action de l'acide cyanhydrique sur l'epiethyline," by M. Lespieau.

Comptes rendus de l'Academie des Sciences, 140, 436–38 (1905).

Whitmore, "Organic Chemistry," 1937, page 151.

"Preparations of Mercaptans from Alcohols," by R. L. Frank and P. V. Smith, "J. Am. Chem. Soc.," 68, 2103 (1946).

Fieser et al.: "Organic Chemistry," 1950, pages 118, 137–138, 141 and 178.

Bullock et al.: "J. A. C. S.," vol. 74, 1868–9 and 3455 (1952).

Ralston: "Fatty Acids and Their Derivatives," 1948, page 179.

Richter: "Organic Chemistry," 1952, page 92.

Kharasch and Reinmuth: "Grignard Reactions of Non-Metallic Substances," 1954, pages 554, 567.